US007599502B2

(12) United States Patent
Stromme

(10) Patent No.: US 7,599,502 B2
(45) Date of Patent: Oct. 6, 2009

(54) SOUND CONTROL INSTALLATION

(75) Inventor: Oyind Stromme, Oslo (NO)

(73) Assignee: Accenture Global Services GmbH, Schaffhausen (CH)

( * ) Notice: Subject to any disclaimer, the term of this patent is extended or adjusted under 35 U.S.C. 154(b) by 1180 days.

(21) Appl. No.: 10/614,764

(22) Filed: Jul. 7, 2003

(65) Prior Publication Data

US 2004/0105555 A1 Jun. 3, 2004

(30) Foreign Application Priority Data

Jul. 9, 2002 (EP) ................................. 02354107

(51) Int. Cl.
*H04R 3/00* (2006.01)
*G06K 9/00* (2006.01)

(52) U.S. Cl. ........................... 381/92; 381/56; 382/103; 348/169; 345/157; 715/700

(58) Field of Classification Search ................... 381/92, 381/56, 122, 58, 110; 382/103, 312; 715/700; 345/157; 348/169
See application file for complete search history.

(56) References Cited

U.S. PATENT DOCUMENTS 4,303,836 A * 12/1981 Lyman ....................... 307/114
6,720,949 B1 * 4/2004 Pryor et al. ................. 345/158
7,028,269 B1 * 4/2006 Cohen-Solal et al. ....... 715/863
2001/0030640 A1 10/2001 Yoneno et al.
2003/0132950 A1 * 7/2003 Surucu et al. ............... 345/700

FOREIGN PATENT DOCUMENTS

EP 0 919 906 A2 6/1999

OTHER PUBLICATIONS

M. Fukumoto et al., ""Finger-Pointer": Pointing Interface by Image Processing", Computers and Graphics, Pergamon Press LTD. Oxford, GB, vol. 18, No. 5, Sep. 1, 1994, pp. 633-642.

* cited by examiner

*Primary Examiner*—Vivian Chin
*Assistant Examiner*—Con P Tran
(74) *Attorney, Agent, or Firm*—Brinks Hofer Gilson & Lione

(57) ABSTRACT

The invention concerns a sound control installation for at least one electrical unit comprising two cameras (4, 5) to take pictures of an area (A) in a space containing the electrical units; three microphones (6, 7, 8) positioned at different locations to sense the sounds in said space; a control screen (3) displaying an image of the space and the electrical units; a control device for positioning on the control screen a cursor (C) in accordance with the movements of the hand of a user detected by the cameras, and for controlling an electrical unit when: the cursor is on the image of an electrical unit, a sound is produced, and a system associated with the microphones checks that the origin of the sound is close to the position of the hand.

20 Claims, 1 Drawing Sheet

SOUND CONTROL INSTALLATION

This application claims the priority benefit of European Patent Application Serial No. 02354107.1, filed Jul. 9, 2002, titled "A SOUND CONTROL INSTALLATION."

FIELD OF THE INVENTION

The present invention relates to an installation to control by sounds electrical units.

It is known to control by sounds, for example in home applications, electrical units such as lamps, plugs . . . . Using sounds (for example hand clicks) to control electrical units is particularly convenient as it does not require the user to physically act on a switch or a remote control apparatus.

However, providing a space such as a room with sound controllable units poses several problems.

A first problem is to distinguish a sound order from an accidental noise (for example, a fall of an object on the floor).

Another problem appears when more than one user is present in the room. Then, a conventional sound controllable unit cannot identify a user from another one.

Another problem is that the conventional equipments are not adapted to allow controlling more than one unit in a same room. In particular, providing a single room with two sound controllable units needs coding the sound control messages. This is complex and increases the number of environmental noises, which may be considered as parasitic control orders.

The present invention aims at providing a sound control installation for controlling electrical units which overcomes the drawbacks of the known equipments.

Another purpose of the present invention is to provide an installation which does not require the user to physically act on a control element.

Another purpose of the present invention is to allow controlling, in a same room, several electrical units without needing to individualize the control sound.

Another purpose of the invention is to distinguish sound orders coming from different users in a same room.

To attain these purposes and others, the present invention provides a remote control device capable of communicating with electrical units to be controlled by means of wired or wireless links, only the control device being controllable with sound by a user.

According to the present invention a schematic 3D-view of a room with the respective locations of electrical units to be controlled is displayed on a screen and, in a predetermined perimeter or area of the room, a hand of a user is tracked with stereo cameras and is used to displace a cursor on the screen. A 3D-microphone array is also provided in order to identify the origin of a sound.

Alternatively, a third camera on the opposite side of the room is used to take pictures of the real units to be controlled and/or for updating in real time the pictures of the control screen.

The tracking of a hand in the area covered by the cameras uses a conventional shape recognition system in video pictures. Further, using a hand of a user as a "mouse" for pointing a cursor of a computerized screen is also known. For example, the Sony VAIO PCG-C1XS system has a piece of software called "Smart Capture Application" and a camera called "Motion Eye" which together have the ability to capture the index finger of the user and link its movement to the movement of the mouse arrow on the computer screen.

According to a preferred embodiment of the present invention, the installation is turned on by a sound which is sensed by the microphones. Such an embodiment allows, as it will be better understood later, to distinguish several hands which could be present in the area covered by the cameras. The selected hand will be the closest from the location at which the sound has been detected.

The system can also check the pointed unit on the control screen by announcing through a loud-speaker an identifiant of the pointed pictogram when the cursor comes on that pictogram.

BRIEF DESCRIPTION OF THE DRAWINGS

These purposes, features and advantages of the invention will become apparent from the following detailed description of embodiments, given by way of illustration and not limitation with reference to the accompanying drawings.

Figure 1:
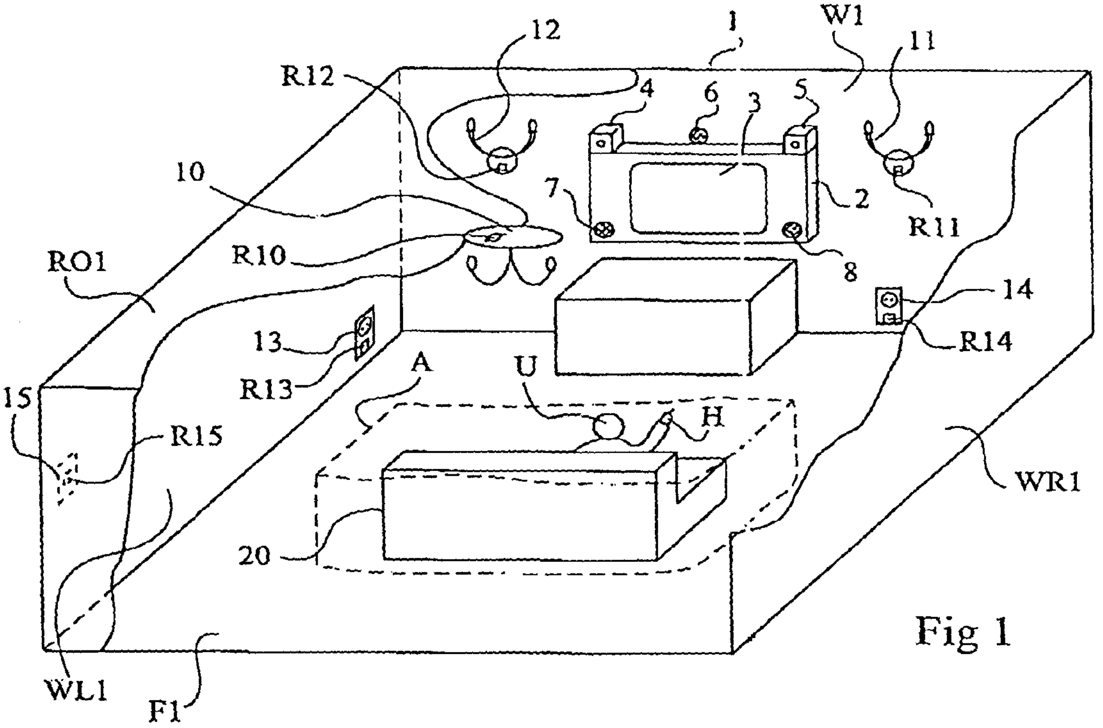
FIG. 1 represents very schematically a room provided with an installation according to the present invention.

For clarity, only the elements useful to the understanding of the invention have been shown in the drawings and will be disclosed hereafter. Especially, the programming steps which have to be made in order to implement the installation according to the present invention will not be detailed as they will readily occur to those skilled in the art. Further, known equipment for determining the location of a hand considered as a cursor, used in the present invention for the control screen, will not be disclosed as known.

DETAILED DESCRIPTION OF THE INVENTION

FIG. 1 represents a room 1 provided with an installation for sound controlling electrical elements according to the invention.

The control installation of the invention comprises a control device 2, a control screen 3 and image and sound sensors. In the represented embodiment, two video cameras 4 and 5 are disposed on the corner of the screen 3 and three microphones 6, 7 and 8 are also disposed around the screen. Each microphone and camera is linked to the control device 2 which controls the screen 3.

The sensors of the same type (video or audio) are not located at a same position so as to be capable of localizing the sound and picture sources.

The microphones can be located anywhere in room 1 and linked (wire or wireless) to device 2. The video cameras 4 and 5 are oriented to watch an area A located in front of the screen 3 so as to film the hand H of a user U who wants to control the electrical units using sound.

The electrical units are, for example, a ceiling light 10, two bracket lamps 11 and 12, two wall sockets 13 and 14, and a switch 15. These electrical units are distributed in the room and are linked to the control device 2. Each electrical unit comprises a radiofrequency receiver R10, R11, R12, R13, R14 and R15 communicating with the control device 2 to receive control orders. Alternatively, the electrical units to be controlled by the installation according to the invention can be wire connected to the control device 2.

An important feature of the invention is that the electrical units that will be rendered sound controllable by the present invention are not individually sound controllable.

Screen 3 is not necessarily contiguous with the control device 2 provided that it is linked to this device and it is visible from the area A watched by cameras 4 and 5, and within line of sight from the microphones. For example, screen 3 can be the screen of a TV set equipped to be controlled by device 2. Then, the area A covered by the cameras 4 and 5 is preferably the area from which the users might be watching TV, for example an area around a sofa 20 disposed in front of the screen 3.

Figure 2:
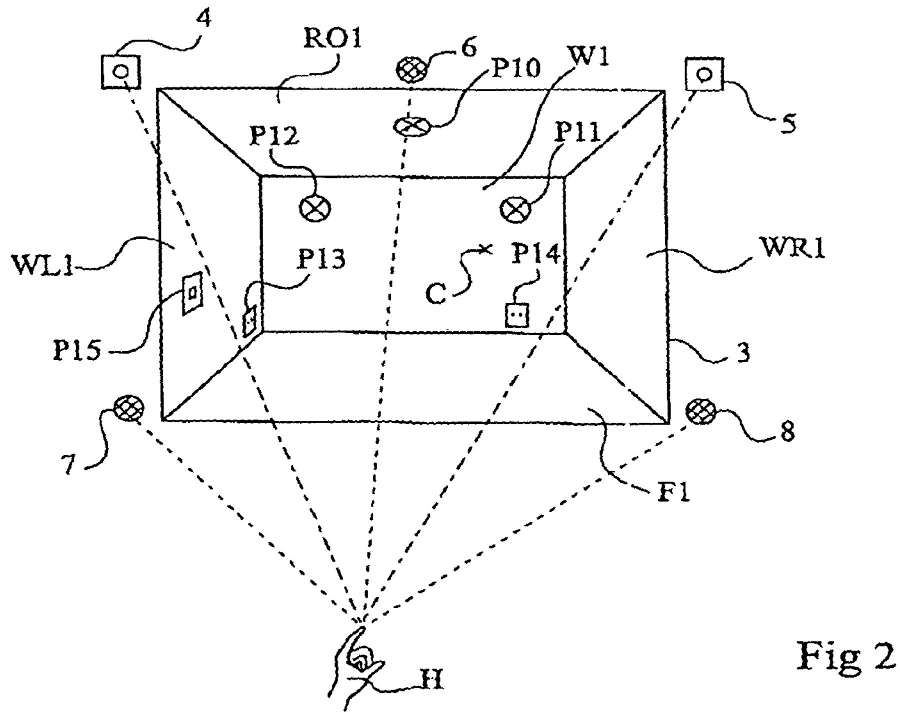
FIG. 2 illustrates a control screen used in an installation for controlling the room of FIG. 1.

FIG. 2 represents an image on screen 3 when the installation is on. According to the invention, the representation is preferably a perspective to display not only the wall W1 of the screen but also the floor F1, the roof RO1, and the walls WR1 and WL1, respectively right and left to the wall W1.

On the screen, the control device 2 displays not only the shape of the room 1 but also, according to a preferred embodiment, pictograms P10, P11, P12, P13, P14 and P15 respectively figuring the units 11, 12, 13, 14 and 15 to be controlled by the installation.

The generation of pictograms P is obtained in a configuring phase of the software controlling the control device 2.

According to a first variant, the user (or the installer) defines the walls of the room and the locations of the pictograms using a conventional graphic software.

According to a second variant, the installation automatically acquires the controllable units at each activation of the installation. According to that embodiment, a third camera (not shown) is provided to film the wall of the room containing the screen and to be able to locate all elements in the room. Manual registration could be included as the control space is 3D, and hence easily definable through a coordinate representation on a computer. The selection of the elements of the room which have to be displayed on the control screen 3 as pictograms is then made by using the communication links between the controllable units and the control device 2. For example, the elements R10 to R15 are not only radiofrequency receivers but also radiofrequency emitters. Then, when the installation is turned on, a request message is sent to all the possibly connected electrical units. The respective units respond with an identifier to allow the identification of the different units. If necessary, the transmission between the various units and the control device 2 is also used to assist the localization made by the video system. The identification of the various electrical units can be used to automatically select a pictogram (socket, switch, lamp, etc.) chosen in a library of the installation.

According to a third variant, the representation of the control screen 3 is a real representation. Then, the transceivers of the controllable units are only used to locate on the picture the area in which the cursor has to be considered as selecting a unit.

The operation of the installation is for example as follows. The cameras 4 and 5 permanently monitor the area A (FIG. 1) and the images are processed to identify the presence of a hand. Known detection systems of human shapes like hands usually use colour differentiation to more quickly isolate the skin area on a picture. The detection of the position of a hand in a dedicated area is made by conventional techniques. If needed, a reference object can be disposed in the field of the cameras to help in matching the referentials of the images of the cameras.

Once the hand H of a user U (FIG. 1) has been detected, the system calculates the displacements of the hand between two successive video pictures to transfer this movement on the cursor C displayed on the control screen 3. Then, the user can see the cursor C move along with his hand displacement to select a unit to control.

Preferably, once the cursor C encounters on the screen a pictogram P of a unit, the user is made aware that a unit can be selected. For example, the system can announce through speakers the name and type of the unit selected. Alternatively, the corresponding pictogram can be highlighted on the screen.

Having selected a controllable unit, the user can make a click with his hand, or produce another noise, to control the corresponding unit. This sound is sensed by the three microphones 6, 7 and 8 and processed to check that it originates from the hand H, or its close neighborhood. For this purpose, the control device 2 calculates the difference between the times of arrival of the sound on the different microphones. Knowing the location of the microphones, the system is then capable of calculating the 2D or 3D location of the sound source.

If the origin of the sound substantially corresponds to the location of the hand H detected by the cameras, then the installation executes the appropriate control.

If not, the installation ignores the sound order which is to be considered as a parasitic noise.

An advantage of the present invention is that the installation is able to distinguish perturbating noise from a control order.

Another advantage of the system of the present invention is that it is possible to individually control more than one unit is the same room.

To distinguish the hands of a user and select only one hand for controlling the cursor C, various solutions can be adopted. A first solution is to consider the hand controlling the cursor as that with the highest degree of motion. Then, the user wanting to use the system knows that he has to move one hand in the area A more than the other and that this hand will be used to control the cursor. Further, the user will see that the cursor displayed on screen 3 follows the displacement of his hand. Another solution is to identify the position (open or closed) of the hands and, preferably, the existence of a finger pointed in the alignment of the arm of the user and to select this shape for controlling the cursor on the screen. The implementation of that solution only needs the control device 2 to be equipped to detect shapes like arms and hands.

According to a preferred embodiment of the present invention, the selection of the hand of a user which has to control the position of the cursor C is made at the activation of the installation, and the installation is sound activated. In other words, the three microphones 6, 7 and 8 permanently listen to the noise in the room, the cameras 4 and 5 being off. When detecting a sound which may be considered as an hand click, the control device 2 switches on cameras 4 and 5 and the first pictures taken by the cameras are analyzed in an area corresponding to the origin of the sound calculated by triangulation with microphones 6, 7 and 8. If a shape recognized as a hand is located in this area, the installation considers that this hand has to be tracked to control the cursor location on the screen. If no hand shape is detected in this area, the installation considers that the noise is a parasitic one. Alternatively, both cameras and microphones can monitor the room permanently.

Also, one could also provide two or more cursors on the screen corresponding to more than one hand. Then, all the cursors will be followed by the camera and the selection of the cursor to be taken into account when a sound is produced can be made by controlling the origin of the sound.

The practical implementation of the present invention is in the ability of one ordinary skilled in the art in view of the functional explanations above. In particular, the programming of a software to be used for initializing and operating the installation according to the invention is not to be detailed as it is in the ability of those skilled in the art.

Even if the present invention has been disclosed in connection with a particular application to home environment, the invention more generally applies to any environment or space where a sound control installation can be used for controlling more than one unit. For example, the area surveyed by the installation can be a car, a storage house . . . .

Various means can be used to determine the origin of the sound; for example, in some simple installations it can be sufficient to use two microphones. Also four microphones could be used. Three microphones only determine position of the hand in two, say x and y dimensions. Two cameras are able to determine all three dimensions, the x and y axes being given by both cameras, and the z-axis is deriving from the disparity map computed by combining simultaneous pictures acquired by the camera pair. With three microphones, redundancy is obtained between x and y axes across sound and picture, which enables the system to check that the hand is where the approved sound is coming from. A fourth microphone mounted at a wall of the room (not the same as the display) would enable the cross-check of valid sound command of hand position across all three dimensions.

Having thus described at least one illustrative embodiment of the invention, various alterations modifications and improvements will readily occur to those skilled in the art. Such alteration, modification, and improvements are intended to be within the spirit and scope of the invention. Accordingly, the foregoing description is by way of example only and is not intended to be limiting. The invention is limited only as defined in the following claims and the equivalent thereto.

The invention claimed is:

1. A sound control installation for at least one electrical unit comprising:
- at least two cameras to take pictures of a determined area in a space containing the electrical units;
- at least two microphones positioned at different locations to sense the sounds in said space;
- a control screen displaying an image of the space and the electrical units;
- a control device for positioning on the control screen a cursor in accordance with movements of a hand of a user detected by said cameras, and for controlling a determined electrical unit when:
  - the cursor is on the image of said determined electrical unit,
  - a sound is produced, and
  - a system associated with the microphones checks that the origin of the sound is close to the position of the hand.

2. The installation of claim 1, in which said at least one electrical unit communicates with the control device through a wired link.

3. The installation of claim 1, in which said at least one electrical unit communicates with the control device through wireless link.

4. The installation of claim 3, in which the wireless link uses a radiofrequency transceiver.

5. The installation of claim 1, in which the electrical units are identified on said control screen by a pictogram located in a picture representing said space.

6. The installation of claim 1, in which several cursors are displayed on said control screen, each cursor following the displacements of a hand in the surveyed area of the cameras.

7. The installation of claim 1 further comprising a third camera to film a picture representing said space and the electrical units to be controlled, the third camera being located in order to film the room from a location not being comprised between said determined area and the control screen.

8. The installation according to claim 1, in which the electrical units are turned on further to the detection of a sound in said space.

9. The installation of claim 8, in which the hand controlling the cursor on the control screen is chosen by matching the detected origin of the activation sound and the location of the hand detected by the cameras.

10. The installation of claim 1, in which, when the cursor comes on the pictogram of an electrical unit on the control screen, the corresponding pictogram is lighted.

11. The installation of claim 1, in which, when the cursor comes on the pictogram of the electrical units on the control screen, the corresponding electrical unit is identified by a sound message.

12. A sound control installation for controlling an electrical unit comprising:
- a camera to take pictures of a determined area in a space containing the electrical unit;
- a microphone positioned to sense the sounds in said space;
- a control device for controlling the electrical unit in accordance with movements of a hand of a user detected by said cameras when:
  - a sound is produced, and
  - a system associated with the microphone checks that the origin of the sound is close to the position of the hand.

13. The installation of claim 12, in which the electrical unit communicates with the control device through a wired link.

14. The installation of claim 12, in which the electrical unit communicates with the control device through a wireless link.

15. The installation of claim 14, in which the wireless link uses a radiofrequency transceiver.

16. The installation of claim 12, further including a control screen, wherein the electrical unit is identified on said control screen by a pictogram located in a picture representing said space.

17. The installation of claim 16, in which several cursors are displayed on said control screen, each cursor following the displacements of a hand in the surveyed area of the cameras.

18. The installation according to claim 16, in which the electrical unit is turned on further to the detection of a sound in said space.

19. The installation of claim 18, in which the hand controlling the cursor on the control screen is chosen by matching the detected origin of the activation sound and the location of the hand detected by the cameras.

20. The installation of claim 16, in which, when the cursor comes on the pictogram of the electrical unit on the control screen, the corresponding pictogram is lighted.

* * * * *

UNITED STATES PATENT AND TRADEMARK OFFICE

CERTIFICATE OF CORRECTION

PATENT NO. : 7,599,502 B2
APPLICATION NO. : 10/614764
DATED : October 6, 2009
INVENTOR(S) : Oyvind Stromme It is certified that error appears in the above-identified patent and that said Letters Patent is hereby corrected as shown below:

On the Title Page

Item (75), replace "Oyind" with --Oyvind--.

Signed and Sealed this
Eighteenth Day of January, 2011

David J. Kappos
*Director of the United States Patent and Trademark Office*

UNITED STATES PATENT AND TRADEMARK OFFICE

CERTIFICATE OF CORRECTION

PATENT NO. : 7,599,502 B2
APPLICATION NO. : 10/614764
DATED : October 6, 2009
INVENTOR(S) : Stromme It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1848 days.

Signed and Sealed this
Twenty-first Day of August, 2012

David J. Kappos
*Director of the United States Patent and Trademark Office*